United States Patent
Kono

(10) Patent No.: US 9,645,645 B2
(45) Date of Patent: May 9, 2017

(54) ELECTRONIC DEVICE

(71) Applicant: KYOCERA CORPORATION, Kyoto-shi, Kyoto (JP)

(72) Inventor: Kenji Kono, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 10 days.

(21) Appl. No.: 14/388,561

(22) PCT Filed: Mar. 26, 2013

(86) PCT No.: PCT/JP2013/002048
§ 371 (c)(1),
(2) Date: Sep. 26, 2014

(87) PCT Pub. No.: WO2013/145717
PCT Pub. Date: Oct. 3, 2013

(65) Prior Publication Data
US 2015/0062031 A1   Mar. 5, 2015

(30) Foreign Application Priority Data

Mar. 26, 2012 (JP) ................................. 2012-069252

(51) Int. Cl.
*G06F 3/041* (2006.01)
*G06F 3/01* (2006.01)

(52) U.S. Cl.
CPC .............. *G06F 3/016* (2013.01); *G06F 3/041* (2013.01); *G06F 3/0416* (2013.01); *G06F 2203/04105* (2013.01)

(58) Field of Classification Search
CPC ............................................ G06F 3/041–3/047
(Continued)

(56) References Cited

U.S. PATENT DOCUMENTS

| 7,839,269 B2 * | 11/2010 | Steger | ................ | A63B 71/0686 340/407.1 |
| 2009/0002328 A1 * | 1/2009 | Ullrich | .................... | G06F 3/016 345/173 |

(Continued)

FOREIGN PATENT DOCUMENTS

| JP | 200765798 A | 3/2007 |
| JP | 4633183 B1 | 2/2011 |

(Continued)

OTHER PUBLICATIONS

International Search Report mailed Jul. 2, 2013 in International Application No. PCT/JP2013/002048.

(Continued)

*Primary Examiner* — Michael Pervan
(74) *Attorney, Agent, or Firm* — Hauptman Ham, LLP

(57) ABSTRACT

An electronic device includes a touch panel, a plurality of tactile sensation providing units configured to provide a tactile sensation to a contact object in contact with the touch panel, and a plurality of first controllers configured to control drive of the plurality of tactile sensation providing units. A first controller of the plurality of first controllers outputs, to a further first controller, a synchronization signal that drives a tactile sensation providing unit associated with the further first controller.

9 Claims, 2 Drawing Sheets

(58) Field of Classification Search
USPC .................. 178/18.01–19.07; 345/173–178
See application file for complete search history.

(56) References Cited

U.S. PATENT DOCUMENTS

| | | |
|---|---|---|
| 2011/0163984 A1 | 7/2011 | Aono |
| 2011/0267294 A1* | 11/2011 | Kildal .................. G06F 3/0414 |
| | | 345/173 |
| 2012/0013220 A1 | 1/2012 | Kawata et al. |
| 2013/0050128 A1* | 2/2013 | Bae .......................... G06F 3/041 |
| | | 345/173 |

FOREIGN PATENT DOCUMENTS

| | | | | |
|---|---|---|---|---|
| JP | 201190615 A | 5/2011 | | |
| JP | 201222537 A | 2/2012 | | |
| WO | WO 2011139093 | * 11/2011 | ............. | G06F 3/016 |

OTHER PUBLICATIONS

Written Opinion mailed Jul. 2, 2013 in International Application No. PCT/JP2013/002048.

* cited by examiner

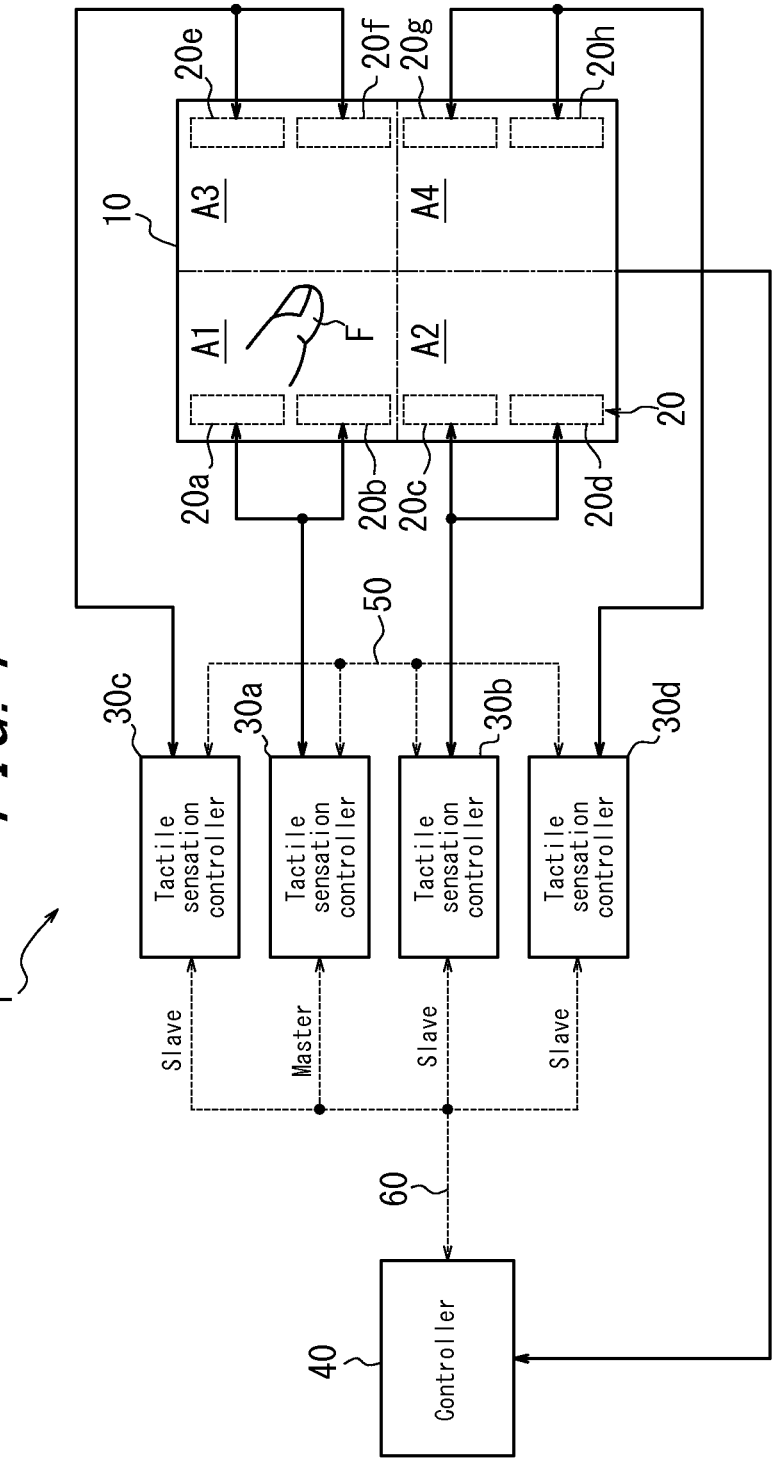

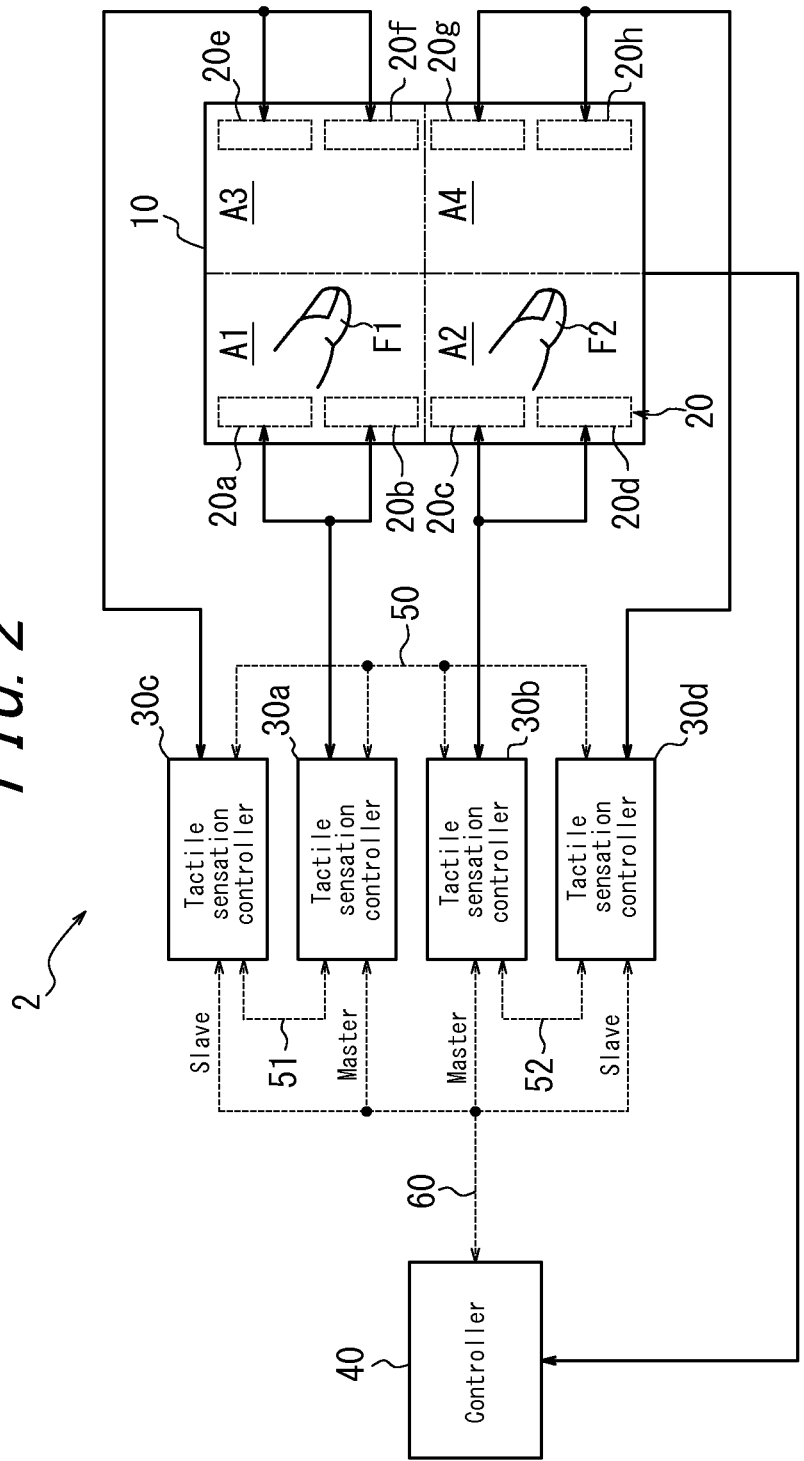

ELECTRONIC DEVICE

CROSS REFERENCE TO RELATED APPLICATION

The present application is a National Phase of International Application Number PCT/JP2013/002048, filed Mar. 26, 2013, and claims the priority of Japanese Patent Application No. 2012-069252 filed on Mar. 26, 2012, the content of which is entirely incorporated herein by reference.

TECHNICAL FIELD

The present invention relates to an electronic device.

BACKGROUND

For example, among electronic devices such as mobile phones, smartphones, tablet terminals, game machines, PCs (Personal Computers), ATM (Automated Teller Machines), automatic ticket vending machines, automatic vending machines, printers, copy machines, fax (facsimile) and home appliances or the like, recently, there is a growing number of electronic devices that detect an input operation by the operator by using a touch panel.

In addition, in such electronic devices, those provided with a tactile sensation providing unit (e.g. piezoelectric element) have been suggested (see, for example, Patent Literature 1). In such electronic devices, when an input operation by which a contact object such as the operator's finger or a stylus pen touches a touch panel is performed, a tactile sensation providing unit is driven to vibrate the touch panel, thereby providing a tactile sensation to the operator.

CITATION LIST

Patent Literature 1: JP4633183 (B1)

SUMMARY OF INVENTION

As disclosed in Patent Literature 1, when the touch panel is vibrated by the tactile sensation providing unit, the size of the touch panel that can obtain enough vibration amplitude with one piezoelectric element is limited. Thus, when the touch panel is large, it is assumed that a plurality of piezoelectric elements are provided.

However, a controller (a tactile sensation controller) that has a built-in drive circuit of piezoelectric element or the like includes, for example an integrated circuit. Thus, due to structural restrictions of the circuit, such as current capacity or the like, the number of piezoelectric elements that can be driven simultaneously is limited. Therefore, when a plurality of piezoelectric elements are mounted, a plurality of tactile sensation controllers are needed. In such a case, when a plurality of tactile sensation controllers are simultaneously driven by a higher order controller, it is assumed that, in some communication systems between the controller and the tactile sensation controllers, the drive timing shift may occur between each tactile sensation controller. Such a drive timing shift may occur, for example, when a communication system by which communication is achieved only between one controller and one tactile sensation controller is employed for the purpose of achieving advanced control signal exchange or the like. As a result of that, it is assumed that the vibration timing by each corresponding piezoelectric element may shift and the sufficient vibration amplitude is not obtained, thus a desired tactile sensation may not be provided to the operator.

Therefore, the present invention has been conceived in light of the above circumstances and provides an electronic device that can vibrate a touch panel by a plurality of tactile sensation providing units with the sufficient amplitude and can provide a desired tactile sensation to the operator.

An electronic device according to the present invention to achieve the above mentioned object includes
a touch panel;
a plurality of tactile sensation providing units configured to provide a tactile sensation to a contact object in contact with the touch panel; and
a plurality of first controllers configured to control drive of the plurality of tactile sensation providing units, wherein
among the plurality of first controllers, one first controller outputs, to other first controller, a synchronization signal that drives the tactile sensation providing unit with which the other first controller is associated.

The electronic device further includes a second controller, wherein the touch panel detects a contact, and the second controller is configured to obtain a position of contact detected by the touch panel:
the plurality of tactile sensation providing units detect a press on the touch panel;
the second controller selects the first controller in response to the position of contact obtained; and
the first controller selected outputs the synchronization signal based on the press on the touch panel detected by the tactile sensation providing unit associated with the first controller.

The electronic device, wherein the second controller controls to cause the number of the first controllers to be selected to differ according to the number of the positions of contact obtained.

The electronic device, wherein the second controller controls to cause the number of the other first controllers that receive the synchronization signal differ according to the positions of contact obtained.

The electronic device, wherein the second controller controls to vary the other first controllers that receive the synchronization signal according to the position and the number of the contacts obtained.

According to the present invention, an electronic device in which a touch panel can be vibrated by a plurality of tactile sensation providing units with the sufficient amplitude and a desired tactile sensation can be provided to the operator may be provided.

BRIEF DESCRIPTION OF DRAWINGS

FIG. 1 is a function block diagram illustrating a schematic configuration of an electronic device according to a first embodiment of the present invention; and FIG. 2 is a function block diagram illustrating a schematic configuration of an electronic device according to a second embodiment of the present invention.

DESCRIPTION OF EMBODIMENTS

The embodiments of the present invention will be described below with reference to drawings.

First Embodiment

FIG. 1 is a function block diagram illustrating a schematic configuration of an electronic device according to a first embodiment of the present invention. An electronic device 1 illustrated in FIG. 1 includes a touch panel 10, piezoelectric elements 20, tactile sensation controllers 30 and a controller 40.

The touch panel 10 is of a known type, such as, for example, a resistive film type, a capacitive type, or the like, and detects a contact of contact object (e.g. a finger or a stylus pen) on an operation face (surface). In addition, the touch panel 10 supplies a signal in response to the detected position of contact to the controller 40. The touch panel 10 is vibratably disposed, for example, on a display screen side of display unit of a liquid crystal display panel (LCD), an organic EL display panel, an electronic paper or the like on which an object that suggests an area to be touched on the operation face to the operator is displayed as an image.

The piezoelectric elements 20 form a tactile sensation providing unit that vibrates the touch panel 10, and are disposed on the opposite side (back side) of the operation face of the touch panel 10. In addition, according to the present embodiment, the piezoelectric elements 20 serve also as detection elements of a press on the touch panel 10. In FIG. 1, four piezoelectric elements 20a-20d and 20e-20h are disposed respectively side by side along the longer sides, opposing each other, of the rectangular touch panel 10. As the piezoelectric elements 20a-20h, rectangular shaped piezoelectric elements having the same structure, such as monomorph, bimorph, unimorph or the like are used. Note that, in this specification, the piezoelectric element is represented by a reference sign of "20" when it is not specified, and represented by a reference sign with an alphabetical suffix added thereto when it is specified.

The tactile sensation controllers 30 form a first controller that controls the drive of the piezoelectric elements 20. In the present embodiment, each tactile sensation controller 30 is configured with an integrated circuit, and in light of the circuit configuration, it can drive two piezoelectric elements 20 in parallel. Therefore, in FIG. 1, four tactile sensation controllers 30a-30d are illustrated. Note that, FIG. 1 illustrates a case where two piezoelectric elements 20 arranged in adjacent to each other on the same longer side of the touch panel 10 are driven by one tactile sensation controller 30. That is, piezoelectric elements 20a and 20b are connected to the tactile sensation controller 30a, piezoelectric elements 20c and 20d are connected to the tactile sensation controller 30b, piezoelectric elements 20e and 20f are connected to the tactile sensation controller 30c and piezoelectric elements 20g and 20h are connected to the tactile sensation controller 30d. Note that, in this specification, the tactile sensation controller is represented by a reference sign of "30" when it is not specified and is represented by a reference sign with an alphabetical suffix added thereto when it is specified.

Furthermore, each tactile sensation controller 30 is configured such that it can obtain, from two piezoelectric elements 20 connected thereto, the data based on press on the touch panel 10. The four tactile sensation controllers 30a-30d are connected each other via a synchronization line 50.

The controller 40 forms a second controller. The controller 40 is configured by using, for example, DSP (Digital Signal Processor), and is connected with four tactile sensation controllers 30a-30d via a control line 60 of, for example, I²C (Inter-Integrated Circuit).

Operation of the electronic device 1 according to the present embodiment will be described below.

In the present embodiment, four tactile sensation controllers 30a-30d correspond to four areas of the touch panel 10. For example, in FIG. 1, the touch panel 10 is divided virtually into four areas A1-A4 by a phantom line, as illustrated. Then, the piezoelectric elements 20a and 20b, the piezoelectric elements 20c and 20d, the piezoelectric elements 20e and 20f and the piezoelectric element 20g and 20h are disposed respectively on the area A1, the area A2, the area A3 and the area A4. Therefore, the tactile sensation controller 30a, the tactile sensation controller 30b, the tactile sensation controller 30c and the tactile sensation controller 30d correspond respectively to the area A1, the area A2, the area A3 and the area A4. The corresponding relation between these areas A1-A4 and the tactile sensation controllers 30a-30d is previously stored in an external memory or an internal memory of the controller 40 or the like.

Then, when receiving a signal corresponding to the position of contact from the touch panel 10, the controller 40 selects (sets) a tactile sensation controller 30 that corresponds to the position (area) of contact as a master, and selects (sets) the other tactile sensation controllers 30 as slaves. For example, in FIG. 1, when a contact of contact object F on the area A1 of the touch panel 10 is detected, the controller 40 selects the tactile sensation controller 30a as a master and the other tactile sensation controllers 30b-30d as slaves.

The tactile sensation controller 30a selected as a master performs a detection operation of a press on the touch panel 10 using the piezoelectric elements 20a and 20b connected to (associated with) the tactile sensation controller 30a. On the other hand, the tactile sensation controllers 30b-30d selected as slaves don't perform a detection operation of a press on the touch panel 10.

In the piezoelectric element 20, when it serves as a press detection element, its voltage (voltage value), which is an electrical characteristic, changes in response to the magnitude of a load (force) of the press on the touch panel 10 (or the speed at which the magnitude of the load (force) changes (acceleration)). The voltage (voltage value (hereinafter referred to simply as data) of each piezoelectric element 20 is obtained by each tactile sensation controller 30 when each piezoelectric element 20 notifies the data to each tactile sensation controller 30 or each tactile sensation controller 30 detects the data of each piezoelectric element 20. Thereby, each tactile sensation controller 30 obtains the data based on press from each piezoelectric element 20.

Therefore, in FIG. 1, the tactile sensation controller 30a selected as a master obtains the data based on press by the piezoelectric elements 20a and 20b. Note that the piezoelectric elements 20a and 20b are connected in parallel, thus in this case, the data of an average value of the piezoelectric elements 20a and 20b is obtained.

Then, when the data based on press satisfies a predetermined criterion, the tactile sensation controller 30a supplies a predetermined drive signal to the piezoelectric elements 20a and 20b to vibrate the touch panel 10. At the same time, the tactile sensation controller 30a outputs a synchronization signal to the other tactile sensation controllers 30b-30d via the synchronization line 50. The tactile sensation controllers 30b-30d are triggered by the synchronization signal and supply a predetermined drive signal to the piezoelectric elements 20c and 20d, the piezoelectric elements 20e and 20f and the piezoelectric elements 20g and 20h respectively connected (associated with) to each of the tactile sensation controllers to vibrate the touch panel 10.

Thus, in the electronic device 1 according to the present embodiment, the controller 40 does not control the drive of the all tactile sensation controllers 30, and the controller 40 selects a tactile sensation controller 30, which will be a master, in response to the position of contact on the touch panel 10. Then, the tactile sensation controller 30 selected as a master detects a press on the touch panel 10 and, when the data based on press satisfies a predetermined criterion, drives the corresponding piezoelectric elements 20. At the same time, the tactile sensation controller 30, which is a master, supplies a synchronization signal to the other tactile sensation controllers 30 to drive the piezoelectric elements 20 associated with the other tactile sensation controllers 30.

Therefore, according to the electronic device 1 of the present embodiment, since drive timings of all of the piezoelectric elements 20a-20h can be matched, the touch panel 10 can be vibrated at the same vibration timing. Thus, the touch panel 10 can be vibrated with enough amplitude, and a desired tactile sensation can be provided to the operator. In addition, a press on the touch panel 10 is detected by a piezoelectric element 20 located close to a contact in response to the position of the contact on the touch panel 10, thus a press can be detected at a high accuracy.

Second Embodiment

FIG. 2 is a function block diagram illustrating a schematic configuration of an electronic device according to the second embodiment of the present invention. In the electronic device 2 according to the present embodiment, a function of providing a tactile sensation individually to the two points of contact by multi-touch is added to the electronic device 1 configured as illustrated in FIG. 1. That is, in the electronic device 2 in FIG. 2, to the two points of contact, each on the area A1 or A3 and on the area A2 or A4, drive of the piezoelectric elements 20a and 20b and the piezoelectric elements 20e and 20f, and drive of the piezoelectric elements 20c and 20d and the piezoelectric elements 20g and 20h can be controlled individually.

Thus, according to the electronic device 2 of the present embodiment, in the configuration illustrated in FIG. 1, the tactile sensation controller 30a that drives the piezoelectric elements 20a and 20b and the tactile sensation controller 30c that drives the piezoelectric elements 20e and 20f are connected each other via the synchronization line 51. In the same manner, the tactile sensation controller 30b that drives the piezoelectric elements 20c and 20d and the tactile sensation controller 30d that drives the piezoelectric elements 20g and 20h are connected each other via the synchronization line 52. Other than that are the same configuration as those illustrated in FIG. 1, thus the description thereof will be omitted.

Operation of the electronic device 2 according to the present embodiment will be described below. Note that, in the present embodiment, a single-touch operation mode by one point of contact or a multi-touch operation mode by two points of contact is set previously by an application executed by the electronic device 2 or the choice by the user. Then, when the single-touch operation mode is selected, the controller 40 operates in the same manner as in the case of the first embodiment.

On the other hand, when the multi-touch operation mode is selected, the controller 40 obtains a signal corresponding to the position of contact on the area A1 or A3 and a signal corresponding to the position of contact on the area A2 or A4 from the touch panel 10. Then, when obtaining the signal corresponding to the position of contact on the area A1 or A3, the controller 40 selects (sets) either one of the tactile sensation controller 30a or 30c as a master and the other one as a sleeve, via the control line 60, in response to the position (area) of contact obtained. That is, in FIG. 2, the tactile sensation controller 30a to which the piezoelectric elements 20a and 20b located close to the position of contact by the contact object F1 are connected is selected as a master and the tactile sensation controller 30c is selected as a slave.

Then, when the data based on press satisfies a predetermined criterion, the tactile sensation controller 30a supplies a predetermined drive signal to the piezoelectric elements 20a and 20b to vibrate the touch panel 10. At the same time, the tactile sensation controller 30a outputs a synchronization signal to the other tactile sensation controller 30c via the synchronization line 51. Thus, the tactile sensation controller 30c is triggered by the synchronization signal and supplies a predetermined drive signal to the piezoelectric elements 20e and 20f to vibrate the touch panel 10.

In the same manner, when obtaining a signal corresponding to the position of contact on the area A2 or A4, the controller 40 selects (sets) either one of the tactile sensation controllers 30b or 30d as a master and the other one as a slave, via the control line 60, in response to the position (area) of contact obtained. That is, in FIG. 2, the tactile sensation controller 30b to which the piezoelectric elements 20c and 20d located close to the position of contact by the contact object F2 are connected is selected as a master and the tactile sensation controller 30d is selected as a slave.

Then, when the data based on press satisfies a predetermined criterion, the tactile sensation controller 30b supplies a predetermined drive signal to the piezoelectric elements 20c and 20d to vibrate the touch panel 10. At the same time, the tactile sensation controller 30b outputs a synchronization signal to the other tactile sensation controller 30d via the synchronization line 52. Thus, the tactile sensation controller 30d is triggered by the synchronization signal and supplies a predetermined drive signal to the piezoelectric elements 20g and 20h to vibrate the touch panel 10. Note that the drive signal output from the tactile sensation controllers 30b and 30d can be the same as that output from the tactile sensation controllers 30a and 30c to provide a tactile sensation of the same mode, or can be different from that output from the tactile sensation controllers 30a and 30c to provide a tactile sensation of a different mode.

In this manner, according to the electronic device 2 of the present embodiment, in the multi-touch operation mode, the touch panel 10 is vibrated with respect to each point of contact by multi-touch, thus a tactile sensation can be provided individually to each point of contact by multi-touch. Moreover, in response to each position of contact by multi-touch, one of the corresponding two tactile sensation controllers 30 is selected as a master and the other is selected as a slave by the controller 40, thus the corresponding four piezoelectric elements 20 are driven at the same time.

Therefore, in each of multi-touch, the touch panel 10 can be vibrated at the same vibration timing, thus the touch panel 10 can be vibrated with enough amplitude, and a desired tactile sensation can be provided to the operator. In addition, for each of multi-touch, a press on the touch panel 10 is detected by a piezoelectric element 20 located close to the position of contact on the touch panel 10, thus, as in the case of the first embodiment, a press can be detected at a high accuracy.

Note that the present invention is not limited to the above mentioned embodiments, and variety of modifications and changes may be made. For example, in the second embodiment, a single-touch operation mode or a multi-touch operation mode may be selected automatically by the controller 40 in response to the number of contacts on the touch panel 10. For example, when the number of positions of contact on the touch panel 10 obtained by the controller 40 is one until the touch panel 10 is vibrated, the single-touch operation mode is selected. On the other hand, when the positions of contact by multi-touch are obtained by the controller 40 before the touch panel 10 is vibrated, the multi-touch operation mode is selected.

At that time, in the case where the positions of contact by multi-touch are obtained with a time lag, when a position of contact is obtained first, one tactile sensation controller 30 is selected as a master as a single-touch operation mode, and after that, when the other position of contact is obtained before the touch panel 10 is vibrated, the operation mode is switched to the multi-touch operation mode. For example, in FIG. 2, when a position of contact by the contact object F1 is detected first, the tactile sensation controller 30a is selected as a master by the single-touch operation mode, and after that, when a position of contact by the contact object F2 is detected, the tactile sensation controllers 30a and 30c are selected as masters by the multi-touch operation mode.

In addition, in the tactile sensation controller 30, when the data based on press satisfies a predetermined criterion may be when the data reaches a predetermined criterion value, when the data exceeds the predetermined criterion value, or the data equal to the predetermined criterion value is detected.

Furthermore, in the above-mentioned embodiments, a tactile sensation controller 30, which will be a master, may be selected automatically based on the application or selected arbitrarily by the user beforehand without obtaining the position of contact on the touch panel 10. In addition, the number of piezoelectric elements 20 that can be driven by one tactile sensation controller 30 is not limited to two, and it can be one or three or more. Furthermore, the tactile sensation providing unit is not limited to a piezoelectric element, and may be configured to vibrate the touch panel 10 by using, for example, an eccentric motor.

Moreover, the present invention can be effectively applied to the case where three or more points of contact are detected as multi-touch. In this case, a tactile sensation controller, which will be a master, may be selected in response to the position of each contact of multi-touch. In addition, the present invention can be effectively applied to the electronic device that detects a contact on the touch panel 10 and provides a tactile sensation without detecting a press on the touch panel 10.

Furthermore, in the above-mentioned embodiments, the data based on press is a voltage value. However, the data based on press is not limited thereto, and may be, for example, a resistance, a strain value (amount), a pressure value (load value) or the like.

REFERENCE SIGNS LIST 1, 2: Electronic device
10: Panel
20, 20a-20h: Piezoelectric element (Tactile sensation providing unit)
30, 30a-30d: Tactile sensation controller (First controller)
40: Controller (Second controller)
50, 51, 52: Synchronization line
60: Control line
A1-A4: Area

The invention claimed is:
1. An electronic device, comprising:
   a touch panel configured to detect a contact of a contact object with the touch panel;
   a plurality of tactile sensation providing units configured to vibrate the touch panel to provide a tactile sensation to the contact object in contact with the touch panel; and
   a plurality of first controllers electrically connected with and configured to control drive of the plurality of tactile sensation providing units,
   wherein
   among the plurality of first controllers, at least one first controller is selected as a master controller configured to output, to at least one further first controller which is a slave controller, a synchronization signal to drive the tactile sensation providing unit with which the slave controller is electrically connected,
   the master controller is electrically connected with and configured to control drive of one of the plurality of tactile sensation providing units which is located in and configured to vibrate a region of the touch panel corresponding to a contact position of the contact detected by the touch panel, and
   the slave controller is electrically connected with and configured to control drive of another one of the plurality of tactile sensation providing units which is located in and configured to vibrate another region of the touch panel different from the region corresponding to the contact position.

2. The electronic device according to claim 1, further comprising a second controller, wherein
   the second controller is configured to obtain the contact position of the contact detected by the touch panel;
   the second controller is configured to select, as the master controller, the first controller electrically connected with the tactile sensation providing unit which is located in the region of the touch panel corresponding to the obtained contact position; and
   the selected master controller is configured to
      perform a detection of a press on the touch panel, using the tactile sensation providing unit electrically connected with the master controller, and
      output the synchronization signal based on the press on the touch panel detected by the tactile sensation providing unit electrically connected with the master controller.

3. The electronic device according to claim 2, wherein the second controller is configured to cause a number of the master controllers to be selected to differ according to a number of contact positions obtained from the touch panel.

4. The electronic device according to claim 3, wherein the second controller is configured to cause a number of the slave controllers for receiving the synchronization signal to differ according to the number of the obtained contact positions.

5. The electronic device according to claim 3, wherein the second controller is configured to vary the slave controller for receiving the synchronization signal according to the contact positions and the number of contacts obtained from the touch panel.

6. The electronic device according to claim 2, wherein the second controller is configured to select more than one master controllers in response to more than one contact positions obtained from the touch panel.

7. The electronic device according to claim 2, wherein the slave controller does not perform a detection of the press on the touch panel, using the tactile sensation providing unit electrically connected with the slave controller.

8. The electronic device according to claim 1, further comprising a second controller, wherein
the second controller is configured to obtain the contact position of the contact detected by the touch panel;
the second controller is configured to select, as the master controller, the first controller electrically connected with the tactile sensation providing unit which is located in the region of the touch panel corresponding to the obtained contact position; and
the second controller is configured to cause a number of the slave controllers for receiving the synchronization signal to differ according to the number of the obtained contact positions.

9. The electronic device according to claim 1, further comprising a second controller, wherein
the second controller is configured to obtain the contact position of the contact detected by the touch panel;
the second controller is configured to select, as the master controller, the first controller electrically connected with the tactile sensation providing unit which is located in the region of the touch panel corresponding to the obtained contact position; and
the second controller is configured to vary the slave controller for receiving the synchronization signal according to the contact positions and the number of contacts obtained from the touch panel.

\* \* \* \* \*